Patented Jan. 3, 1939

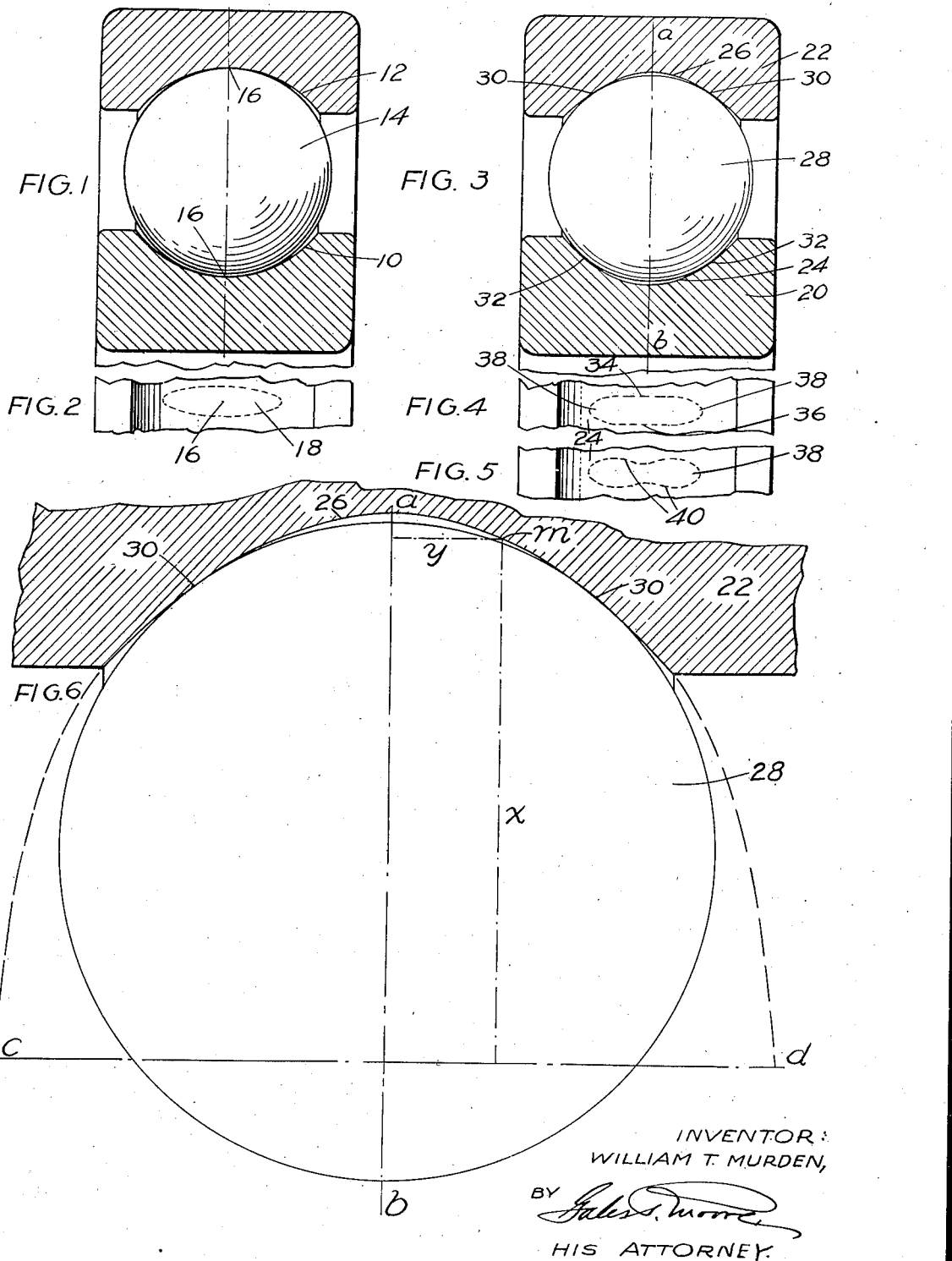

2,142,477

UNITED STATES PATENT OFFICE 2,142,477

BEARING

William T. Murden, Forestville, Conn., assignor, by mesne assignments, to General Motors Corporation, Detroit, Mich., a corporation of Delaware Application April 14, 1930, Serial No. 444,114
Renewed September 19, 1935

20 Claims. (Cl. 308—193)

My invention relates to bearings and is especially applicable to ball bearings and the like, my primary object being to more evenly distribute the stress occurring between bearing elements. To this end, and also to improve generally upon devices of the character indicated, my invention consists in the various matters hereinafter described and claimed.

In the accompanying drawing, Figure 1 is a transverse sectional elevation of part of a bearing as commonly heretofore constructed; Figure 2 is a plan view of a portion of the inner race-member shown in Figure 1, a certain area of contact being indicated thereon; Figure 3 is a view, of the general character of Figure 1, of a bearing constructed according to my present invention; Figure 4 is a view thereof generally similar in character to Figure 2; Figure 5 is also a generally similar view but showing the contact area of a modified curve; and Figure 6 is a diagrammatic view indicating the transverse curve of the race-way of Figure 3. In these views the transverse curves of the race-ways are necessarily distorted to facilitate illustration, the full lines show the position of the parts when the bearing is not under load, and the ball illustrated is that one of the annular ball-set that will be most heavily loaded when load is applied to the bearing.

In ball bearings as commonly heretofore constructed the race-surfaces 10 and 12 of the respective race-rings have had transverse curvatures on arcs of circles having radii slightly greater than that of the co-operating balls, 14, so that when assembled and under no load such race-ways have been tangential to the balls in the line of load, as at the points 16. The steel of which such bearings are constructed being compressible and elastic, when such a bearing is subjected to a normal load (that is, to one of the loads within the range for which the particular bearing is designed and rated) the race-rings and the balls under load become elastically deformed, and the area of contact between such a ball and each of its race-rings necessarily becomes elliptical, about as indicated at 18 in Figure 2. This sets up stress detrimental to the life of the bearing, especially as, in these bearings, stress is not uniform over an elliptical area or even along any line in the length of the ellipse, but such stress is considerably concentrated at the central point, 16, whereby when the bearing rotates under load a great proportion of the entire stress is concentrated upon a relatively small part of a ball and of each race-ring, and the material of those small parts is subjected to considerable constantly recurring flexure, which is detrimental to the life of those bearing parts. Furthermore, in radial bearings and in pure thrust bearings the greatest stress is usually at the thinnest section of the race-ring and decreases toward the thicker sections.

In the illustrated embodiment of my invention the race-members or rings 20 and 22 have their race-surfaces, 24 and 26 respectively, so curved transversely that when the bearing is not under load, although a race-surface is tangential to the ball 28 at points, 30 and 32, upon opposite sides of the load line $a$—$b$, such race-surface is spaced from the ball at the load line, but is so spaced by only such a distance as will be closed up by the bearing elements (the ball and the race-rings) as those elements come into bearing engagement when the bearing is under a normal load, the relative mutual approach of these elements being permitted by the compressibility of the material; and, when the bearing is not under load, as each race-way progresses to either side, away from that central load line, it gradually curves toward the ball until it reaches its tangent points 30 or 32, which are equidistant from the before-mentioned line of load, the curve being noncircular (to avoid the production of any detrimental elliptical contact area under load) but preferably being smooth and unitary from one tangent point to the other; and beyond each point of tangency the curve continues toward the co-operating race-ring, the ball-surface diverging from that curve. This avoids the production of the detrimental elliptical contact area which has necessarily heretofore resulted when the circular curve of the ball has met the transverse circular curve of its raceway, so that in the present structure the great central concentration of stress above referred to is eliminated, and, on the contrary, when the load is being applied the stress starts at the two, separated, initial points of tangency, as at 30, and gradually spreads as the load increases until the stress is distributed over the whole distance between those initial contact points and even beyond each of them (toward the adjacent edge of the bearing), whereby there is maximum distribution of the stress with minimum amount of stress at any one point, and flexure of material is greatly reduced. Also, as the ball and its race-rings are, under normal load, in load-supporting contact for the whole distance across the bearing between the two outermost contact points, no projecting ribs or ridges in the plane in which the bearing rotates are produced and, therefore, flexure due to such ribs or ridges is prevented. The above-mentioned distribution of stress greatly increases the life of the bearing, permits desirable reductions and variations as to thickness of race-rings and diameters of balls without decreasing efficiency, and also enables the use of smaller bearings to support given loads, thereby permitting the introduction of efficient bearings into restricted spaces.

In the illustrated embodiment, at the vertex of the curve (in the line $a—b$) and in the more immediate region of that vertex the radii of the race-way curve are less than the radius of the ball, and as that curve progresses away from the vertex its radii gradually increase in length. At the points of tangency and in the regions more immediately adjacent them the radii are greater than the ball radius, thus insuring, under load, substantially equal distribution of stress between the above-mentioned points of tangency and the gradual tapering off of the stress outwardly beyond those points. A curve that fulfills my purposes when a ball having a diameter of seventeen thirty-seconds of an inch is employed and the parts are constructed of the steel now commonly used for ball-bearings, is that of an ellipse defined by the equation $$\frac{x^2}{(.315)^2}+\frac{y^2}{(.287)^2}=1$$

where from any point, $m$, of the curve, $x$ is the perpendicular distance to the minor axis $c—d$ of the ellipse and $y$ is such distance to the major axis $a—b$. That curve locates each point of tangency at an angle of approximately twenty-five degrees to the central load-line, $a—b$, and, at the vertex, has a radius of curvature of twenty-six-hundred-and-fifteen ten thousandths of an inch (which is approximately four thousandths of an inch smaller than the radius of the engaged ball); and, when the bearing is not under load, the vertex is spaced approximately two ten-thousandths of an inch from the ball, while, in a line perpendicular to that load-line at one-eighth of an inch nearer the ball center than is the vertex (and thus between the tangent points and the ball center), the race-curve is spaced from the ball by approximately four thousandths of an inch. When the bearing is under a normal load this produces an area of contact between a ball and its race-members in which the major portion is substantially rectangular and has sides 34 and 36 which are substantially parallel with each other, while from the ends of that substantially rectangular major portion the contact area tapers off as indicated at 38 in Figure 4. The result of this is that along any longitudinal line of that rectangle, extending transversely of the race-member, the stress is substantially uniform per unit of length, while away from each end of that rectangle the stress somewhat gradually diminishes to nothing, so that the stress is distributed with the advantages herein-above recited. Thus, as indicated in Figure 4, the described curve enables the normal load to effect interengagement of the bearing-members across that width in which interengagement's advantageous feature of load-support is not overcome by detrimental rubbing friction (as would occur by interengagement at what may be termed the "sides" of the ball), and yet that curve prevents such normal load from causing interengagement beyond such width, which I have sometimes termed the width, or arc, of contact under normal load, and sometimes the place of contact. And in that width the described curve lies closer to the surface of its cooperating bearing-member than does the earlier mentioned circular curve heretofore employed, with the result that less deflection of material is necessary at points of initial contact in order to enable interengagement at other points. Much distribution of stress results even when the center of the raceway curve (at the line $a—b$) is initially so spaced from the ball that the sides of the major portion of the contact-area are not entirely straight, as, for example, when that center is so far removed from the ball that under normal load that central portion engages the ball so relatively lightly as to produce an area of contact whose major portion has sides 40 somewhat contracted at their central portions, so that such major portion is wasted. I prefer to so proportion the curve that when the bearing is under normal load the stress at any point in the line between initial points of contact will equal the stress at every other point in that line,—the points of tangency, as 30, being approximately those at which minimum stress heretofore resulted, the greatest distance between ball and race-surface (in the arc between those tangent points) being at the center where heretofore there has been the greatest stress, and the race-way curve, as it proceeds from the tangent points to that center, gradually and smoothly departing from the ball surface.

Thus a bearing of a given size and material constructed according to my present invention has greater life than a similar bearing as heretofore constructed, and can sustain greater loads.

I claim:

1. In a bearing, co-operating bearing elements which initially engage each other at separated points, the engaging surface of one of said elements between said points being substantially the curve of the ellipse which is proportioned to the co-operating surface of the other said element substantially as the ellipse defined by the equation $$\frac{x^2}{(.315)^2}+\frac{y^2}{(.287)^2}=1$$

is proportioned to a circle having a diameter of seventeen thirty-seconds of an inch; substantially as described.

2. In a bearing, co-operating bearing elements which initially engage each other at separated points and are so spaced from each other between said points that when the bearing is under normal load said elements contact each other throughout the whole distance between said points; substantially as described.

3. In a bearing, co-operating bearing elements which initially engage each other at separated points and are so spaced from each other between said points that when the bearing is under normal load said elements contact each other throughout the whole distance between said points, said elements being initially separated from each other beyond said points by spaces that gradually increase as they proceed outwardly from said points; substantially as described.

4. In a bearing, balls, and their co-operating race-member having a transversely curved race-surface whose point at substantially the line of load is initially so spaced from a ball that when said elements are under normal load said point contacts with said ball, said race-surface initially being also tangent to said ball at points substantially equidistant from said load line, gradually approaching said ball as the curve proceeds from said load line to said points of tangency, and being gradually increasingly spaced from said ball beyond said points of tangency; substantially as described.

5. In a bearing, co-operating bearing elements having curved opposing surfaces, the curve of one of said elements being unitary and having, at its vertex, a radius less than that of the other said element and also having, at points upon opposite sides of said vertex, a radius greater than that of said other element said elements under normal load being in contact in the region of said vertex; substantially as described.

6. In a device of the character indicated, co-operating tangent load-supporting members which are curved transversely and one of such curves being non-circular, said members engaging at the vertex of the curve of one of them when under load, and the radius of such curvature of the one said member at said vertex being substantially no greater than that of the other said member; substantially as described.

7. In a bearing, co-operating bearing elements which initially engage each other at separated points and under load, engage throughout substantially the whole distance between said points, the engaging surface of one of said elements being a substantially unitary curve that is substantially symmetrical with respect to the load line, and from one of said points to the other thereof is smooth and gradual and composed substantially wholly of non-circular elements; substantially as described.

8. For a radial type ball bearing, an inner race having a raceway and balls, a ball in contact with said raceway, said raceway being formed initially with a variable curvature more closely approaching the ball curvature at the place of contact under radial load than at regions adjacent thereto.

9. For a radial type ball bearing, an outer race having a raceway and balls, a ball in contact with said raceway, said raceway being formed initially with a variable curvature more closely approaching the ball curvature at the place of contact under radial load than at regions adjacent thereto.

10. A ball bearing having a raceway a cross section through which has the form of a variable curve having its smallest radius of curvature in substantially the center of the place of contact under load, the curvatures of the ball and raceway gradually diverging from each other at the ends of the place of contact to effect gradual reduction in load.

11. In a device of the character indicated, co-operating load-supporting members both of which are curved in transverse cross-section, one of said members being initially of variable curvature which at the arc of contact under normal load more closely approaches the curvature of the other said member than at regions beyond said arc; substantially as described.

12. In a device of the character indicated, co-operating load-supporting members, one of which is convex and the other concave in transverse cross-section and has an apex, said members being spaced apart beyond the arc of contact under normal load, and said concave member being engageable with the convex member at the apex of the former when under normal load and having a radius of curvature at said apex no greater than that of said convex member at the corresponding point when under no load; substantially as described.

13. In a device of the character indicated, a ball, and a cooperating race-member having an apex and a curved transverse cross-section of variable-radius that contacts with the ball at said apex under normal load and is spaced so far from said ball beyond the arc of contact under normal load that such load cannot effect engagement there, the radius of curvature at the apex of said race-member being no greater than that of said ball; substantially as described.

14. In a device of the character indicated, a ball, and a cooperating race-member having a transverse cross-section which is a substantially elliptical arc whose vertex has a radius of curvature substantially no greater than that of said ball; substantially as described.

15. In a device of the character indicated, co-operating load-supporting members spaced so far apart beyond the arc of contact under normal load that such load cannot effect engagement there, one of said members having a transverse cross-section that is a substantially circular arc, and the other said member having a curved transverse cross-section whose apex engages said circular arc under normal load and whose radius of curvature at the apex is substantially no greater than that of said circular arc, the curve of said second-mentioned member being, at the edges of the arc of contact under normal load, closer to the aforesaid circular arc than could be obtained by a curve of circular arc giving the same contact under the same load; substantially as described.

16. In a device of the character indicated, co-operating load-supporting members, one of which has in transverse cross-section a smooth curve of variable radius, said curve so diverging from the cooperating said member beyond the width of contact under normal load that such load cannot effect engagement there, but said curve being sufficiently similar to the contour of the cooperating said member in said width that normal load effects engagement there with substantially equal stress-distribution per unit of length; substantially as described.

17. In a device of the character indicated, co-operating load-supporting members, one of which has a transverse cross-section of engagement that is substantially the arc at the vertex of the major axis of an ellipse; substantially as described.

18. In a device of the character indicated, co-operating load-supporting members whose engaging surfaces are related to each other substantially as are a circular arc and a cooperating elliptical arc of the region of the vertex on the major axis of the ellipse; substantially as described.

19. In a device of the character indicated, a substantially spherical rolling-member, and a cooperating race-member which has a concave transverse cross-section that is substantially the arc at the vertex of the major axis of an ellipse whose radius of curvature at said vertex is substantially no greater than that of said rolling-member; substantially as described.

20. In a device of the character indicated, a rolling-member, and a cooperating race-member, each of which has a curved transverse cross-sectional contour, said race-member contour more closely approaching the rolling-member curvature at the place of contact therewith than at regions laterally adjacent thereto, and said place of contact being so disposed that the plane through its center and through the center of the rolling-member when the latter is substantially central with said place of contact is substantially the plane of travel of said rolling-member; substantially as described.

WILLIAM T. MURDEN.